United States Patent [19]

Way

[11] 4,101,219
[45] Jul. 18, 1978

[54] APPARATUS FOR CALIBRATING AN OPTICAL NULL SPECTROPHOTOMETER

[75] Inventor: Allan S. Way, Irvine, Calif.

[73] Assignee: Beckman Instruments, Inc., Fullerton, Calif.

[21] Appl. No.: 702,252

[22] Filed: Jul. 2, 1976

[51] Int. Cl.$^2$ .................. G01J 3/42; G01R 15/10
[52] U.S. Cl. .................. 356/89; 250/214 L; 324/132
[58] Field of Search ............... 356/88–89, 356/93, 95–97; 250/214 L; 324/132

[56] References Cited

U.S. PATENT DOCUMENTS

| | | | |
|---|---|---|---|
| 2,492,901 | 12/1949 | Sweet | 250/214 L |
| 2,658,180 | 11/1953 | Boisblanc | 324/132 |
| 3,504,977 | 4/1970 | Matthews | 356/95 |
| 3,525,942 | 8/1970 | Boronkay et al. | 250/214 L |

Primary Examiner—John K. Corbin
Assistant Examiner—Wm. H. Punter
Attorney, Agent, or Firm—Robert J. Steinmeyer; Robert R. Meads; John R. Shewmaker

[57] ABSTRACT

A double beam optical null spectrophotometer having sample and reference optical beam paths, a detector common to both paths, and an attenuator feedback loop from the detector for adjusting the position of an optical attenuator in the reference beam path to balance the energy in the two paths. The slider of an attenuator transmitting potentiometer follows the position of the optical attenuator and a signal level sensitive impedance network connected to the slider calibrates the potentiometer such that an output signal therefrom indicates the true transmittance of a sample in the sample beam path over a range of transmittance values from zero to one hundred percent transmittance.

2 Claims, 3 Drawing Figures

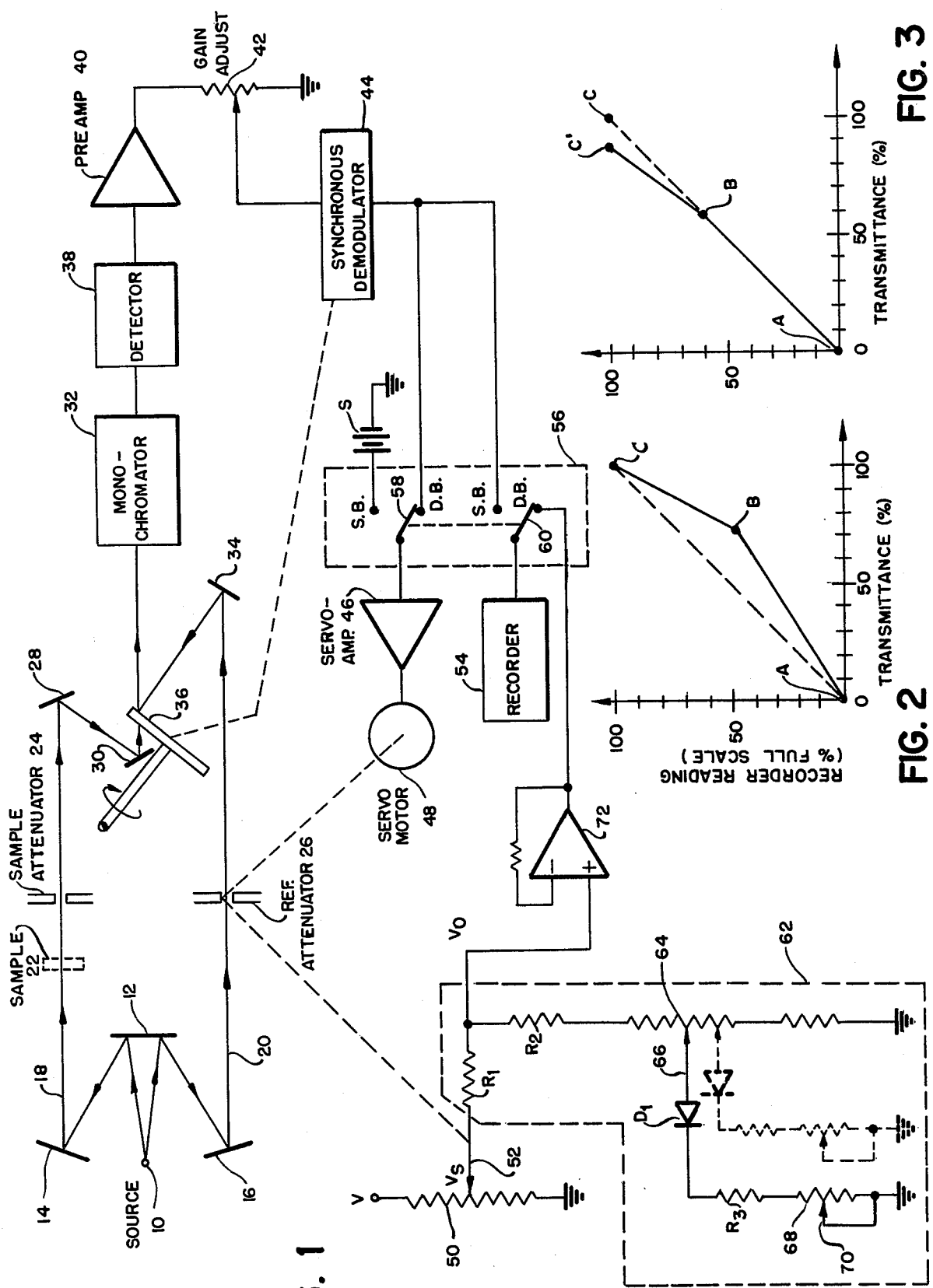

APPARATUS FOR CALIBRATING AN OPTICAL NULL SPECTROPHOTOMETER

BACKGROUND OF THE INVENTION

1. Field of the Invention

The present invention relates to double beam optical null spectrophotometers and, more prticularly, to improved apparatus for calibrating such spectrophotometers which corrects photometric errors introduced by radiation source inhomogeity and other imperfections in the optical system of the spectrophotometer.

2. Description of the Prior Art

In spectrophotometers of the above type, radiation from a source is switched between sample and reference beam paths and is recombined at a detector. A sample to be analyzed is positioned in one beam path and the resulting error signal at the detector is coupled in a feedback loop to adjust the position of an optical attenuator in the other beam path to balance the energy in the two paths and produce a null at the detector. When the system is at null, the position of the optical attenuator theoretically corresponds to the true transmittance of the sample. The slider of an attenuator transmitting potentiometer is driven in synchronism with the optical attenuator to generate a potentiometer output signal indicative of the optical attenuator position. The output signal is supplied to a recorder to provide a record of sample transmittance, usually over a range of wavelengths as scanned by a monochromator.

Unfortunately, however, because of radiation source inhomogeniety, attenuator imperfections, detector irregularities and the like, the position of the optical attenuator, and thus the transmitting potentiometer output signal, is not a true indication of sample transmittance over the range of optical attenuator positions from zero to 100 percent transmittance. As a result, a plot of the potentiometer output signal vs. true sample transmittance, which ideally should be linear, is nonlinear over at least a portion of the range. Unless corrected such nonlinearity can introduce an instrument error of 5 percent or more in the measurement of sample transmittance.

To linearize the relationship between the potentiometer output signal and sample transmittance, it has been the practice to hold the optical attenuator and optics to extremely close tolerances. Unfortunately, such an approach has not resulted in a truly linear relationship and has proven very expensive to implement.

To allow a certain amount of relaxation in the previously rigid manufacturing tolerance requirements, U.S. Pat. No. 3,504,977 (Matthews), assigned to the assignee of the present invention, describes a calibration method and apparatus incorporating an attenuator transmitting potentiometer having multiple taps and trimmer potentiometers connected to the taps. The optical attenuator is progressively positioned in the beam path and, for each position, the trimmer potentiometers of the transmitting potentiometer are adjusted to tailor the actual potential at each position along the transmitting potentiometer to a value representing true sample transmittance. While this approach does correct for instrument nonlinearity, the multiple tap trimmer potentiometer arrangement is complex and expensive and is thus restricted in commercial implementation. As a result, a need exists for a simple and inexpensive apparatus for calibrating a double beam optical null spectrophotometer to generate and record a signal truly indicative of the transmittance of a sample to be measured. The present invention fulfills these needs.

SUMMARY OF THE INVENTION

The present invention relates to a double beam optical null spectrophotometer including an optical attenuator for balancing the energy in sample and reference beam paths, an attenuator transmitting potentiometer having a slider driven in synchronism with the optical attenuator and a signal level sensitive impedance network connected to the slider to linearize the relationship between the output signal from the potentiometer and the transmittance of the sample being measured. In a preferred embodiment, the impedance network includes resistance means coupled between the slider and a source of potential and a signal level sensitive switch means coupled across a portion of the resistance means for effecting impedance changes in the impedance network with changes in the voltage at the slider. In a preferred form, the switch means may comprise a nonlinear circuit element, such as a diode, connected in series with a variable resistor between the source of potential and an adjustable slider on the resistance means. In each instance the signal level sensitive impedance network modifies the potentiometer output signal to achieve a linear relationship between the potentiometer output signal and the true transmittance of a sample over the full range of transmittance values.

BRIEF DESCRIPTION OF THE DRAWING

FIG. 1 is a schematic diagram of a double beam optical null spectrophotometer incorporating the calibration apparatus of the present invention.

FIG. 2 is a plot of recorded transmittance values (% of full scale) vs. true sample transmittance and illustrates a typical deviation from a linear relationship.

FIG. 3 is a plot similar to FIG. 2 illustrating the linearity correction achieved by the calibration apparatus of the invention.

DESCRIPTION OF THE PREFERRED EMBODIMENT

In addition to the signal level sensitive impedance network of the present invention (62), FIG. 1 depicts a conventional double beam optical null spectrophotometer including a radiation source 10, beam splitter 12, and respective reflecting mirrors 14 and 16 which direct radiation from the source along a sample beam path 18 and a reference beam path 20. A sample, indicated generally by numeral 22, having an optical characteristic such as transmittance or absorbance to be measured, is positioned to intercept radiation in the sample beam path 18. Attenuators 24 and 26, such as movable combs or variable slit width jaws, are positioned to attenuate the radiation in the respective beam paths. Typically, the level of attenuation of each attenuator is adjustable through a range of positions between zero and one hundred percent transmittance.

The radiation in the sample beam path 18 is directed by respective mirrors 28 and 30 toward monochromator 32. Radiation in the reference beam path 20 is directed toward the monochromator by mirror 34 and rotating mirror 36, each of conventional design. Rotating mirror 36 alternately passes enery from sample beam path 18 and directs energy from reference beam path 20 to the monochromator. The monochromator disperses the recombined beam and focuses a narrow bandwidth of wavelengths on a detector 38. By scanning a spectrum of wavelengths, the monochromator enables the spectrophotometer to measure the transmittance of the sample 22 as a function of the wavelength spectrum.

The output signal from detector 38 is amplified by an amplifier 40 and coupled through a gain control potentiometer 42 to a synchronous demodulator 44. The operation of the demodulator is synchronized to the rotation of rotating mirror 36 in a conventional manner as illustrated diagrammatically in FIG. 1 by the dashed line therebetween. The output of the demodulator 44 is typically a signal having an amplitude proportional to the difference in energy of the radiation in the respective sample and reference beam paths 18 and 20 and a polarity dependent upon which of the energies is larger. Conventionally, the demodulator signal is applied through a servo amplifier 46 to a servomotor 48. The servomotor is mechanically coupled to reference beam attenuator 26 to vary the attenuation in the reference beam path until the energy in the reference and sample beams is equal, at which time the output signal from the detector 38 is at null. The detector responds only to a change in radiation and, thus, the detector output is zero whenever the energy in both the sample and reference beams is equal. If the system is perfectly linear, the position of the reference attenuator 26 when the energy is balanced in the above manner is a true indication of the transmittance of sample 22.

The position of reference attenuator 26 is translated into an electrical signal by an attenuator transmitting potentiometer 50 connected across a d.c. source of potential V and having a slider 52 mechanically connected to the reference attenuator 26 or the servomotor 48 for movement in synchronism therewith. Conventionally, the voltage $V_S$ from the slider 52 is supplied to the input of a recorder 54 to provide a record of the movement of the reference attenuator 26 and hence a record of the sample transmittance.

In accordance with the present invention and to calibrate the potentiometer 50 so that a truly linear relationship exists between the recorded signal and the true transmittance of the sample, the spectrophotometer of FIG. 1 includes a switching mechanism 56 and a signal level sensitive impedance network 62 coupled to the slider 52 of the potentiometer. Switching mechanism 56 switches the spectrophotometer between double beam and single beam operating modes and in this regard includes first and second ganged switches 58 and 60 positionable to two corresponding contacts labeled as double beam (D.B.) and single beam (S.B.). In the double beam position, switch 58 completes the system attenuator feedback loop to couple the output signal from demodulator 44 to the servo amplifier 46 and motor 48 to drive the reference attenuator 26. In the double beam position, switch 60 couples slider 52 of attenuator transmitting potentiometer 50 to the recorder 54. The double beam setting of the switching mechanism 56 represents the normal operating position for the spectrophotometer in which an output signal ($V_O$) from the transmitting potentiometer 50, as recorded by recorder 54, represents the position of the reference attenuator 26 and hence the transmittance of the sample 22 in the sample beam path 18.

In the single beam mode, switch 58 disconnects the attenuator feedback loop and connects a voltage source S to the servo amplifier 46 and motor 48 to drive the reference attenuator 26 closed and thereby block the reference beam path 20. In the single beam mode, switch 60 disconnects the slider 52 from the recorder 54 and connects the recorder to receive the output signal from the demodulator 44. The single beam setting of the switching mechanism 56 thus represents spectrophotometer operation with one beam path (e.g. the reference beam path 20) blocked so that the output signal from demodulator 44 as recorded by recorder 54 indicates the transmittance of the other beam path (e.g. the sample beam path 18). That is, in the single beam mode, the recorded signal represents the single beam energy in the sample beam path 18. By employing linear electronics, the recorded single beam output signal will always represent the true transmittance of the sample beam path.

In the illustrated form of the invention, the signal level sensitive impedance network 62 includes a voltage divider comprising resistors $R_1$ and $R_2$ and a potentiometer 64 connected in series with the resistor $R_2$ and to a source of potential illustrated as ground potential. Impedance network 62 further includes a nonlinear circuit element, diode D1, connected in series with a resistor $R_3$ and a potentiometer 68 between an adjustable slider 66 of the potentiometer 64 and the source of ground potential. An adjustable slider 70 of potentiometer 68 is also connected to the source of ground potential. Thus arranged, the network 62 operates to modify the voltage $V_S$ at the slider 52 and to develop a potentiometer output signal $V_O$ at a junction of resistors $R_1$ and $R_2$ which is coupled through a voltage follower buffer amplifier 72 to the recorder and which represents the true transmittance of the sample. In this regard, the impedance of the network 62 is a function of the level of $V_S$. For a first range of values of $V_S$, diode $D_1$ is nonconductive and the impedance of the network is a first value determined by the resistance of $R_1$, $R_2$, and potentiometer 64. For a second range of values of $V_S$, diode $D_1$ is conductive thereby connecting the circuit branch comprised of diode $D_1$, $R_3$, and potentiometer 68 in parallel with a lower portion of potentiometer 64. In this latter configuration, the impedance of network 62 is a second value determined by the resistance of $R_1$, $R_2$, potentiometer 64 and the circuit branch including diode $D_1$, $R_3$, and potentiometer 68. The actual turn-on point of diode $D_1$ is set by the position of slider 66 of potentiometer 64 while the resistance of the circuit branch is set by the position of slider 70 of potentiometer 68.

The manner by which the slider voltage $V_S$ is modified to $V_O$ by the signal level sensitive impedance network 62 will best be understood in connection with the method of calibrating the spectrophotometer. Basically, calibration is achieved by setting the switching mechanism 56 in each of the single beam mode and the double beam modes for a selected setting of sample attenuator 24, recording both the single beam mode output signal from demodulator 44 and the double beam mode output signal from transmitting potentiometer 50, equalizing the recorded single beam and double beam output signals by adjusting one or both of the gain control potentiometer 42 and the signal level sensitive impedance network 62, as necessary, and thereafter verifying equality between the single beam and double beam readings at selected settings of sample attenuator 24 between zero and 100% transmittance. If the single beam and double beam readings are not equal, then the foregoing steps are repeated until equality is achieved at all settings between zero and 100% transmittance.

FIG. 2 illustrates the relationship between the recorded double beam output signal (Y-axis) and the recorded single beam output signal (X-axis). The Y-axis is labeled in percent of full scale voltage recorded by recorder 54 in the double beam mode. That is, for example, at 50% the recorder reads 50% of full scale, while at 100% the recorder reads 100% of full scale. The single beam reading along the X-axis is expressed in percent transmittance. It will be appreciated that the relationship between the double beam and single beam output signals should ideally follow the straight line path AC. However, because of the system imperfections previously discussed, the relationship typically takes the form illustrated by segments AB and BC.

A plot of FIG. 2, for a spectrophotometer which does not include the signal level sensitive impedance network 62 of the invention, would be derived as follows. First, the sample attenuator 24 is set at 0% transmittance and switching mechanism 56 is set in each of the single beam mode and the double beam mode to ensure that the recorded single beam and double beam output signals are zero for the 0% transmittance setting.

Second, the switching mechanism 56 is set in the double beam position and the sample attenuator 24 is adjusted until recorder 54 reads 100% of full scale. For example, if the recorder is a recording pen graphical plotter, the operator adjusts the sample attenuator until the pen is driven to the full scale position on the graph paper. Switching mechanism 56 is then set in the single beam position, and the gain control potentiometer 42 is adjusted until the signal recorded in the single beam mode equals the recorded double beam signal. That is, the operator adjusts potentiometer 42 until the pen of recorder 54 is driven again to its full scale position.

The foregoing procedure establishes the zero and 100% transmittance points A and C, respectively, of the FIG. 2 plot. Thereafter, without further adjustment of potentiometer 42, if similar double beam and single beam measurements are taken for selected settings of the sample attenuator 24 between zero and 100%, the resulting curve typically takes the form illustrated by segments AB and BC in FIG. 2.

In accordance with the present invention, with signal level sensitive impedance network 62 installed, the linearity deviation illustrated in FIG. 2 is corrected and the spectrophotometer is calibrated as follows. First, sample attenuator 24 is set at 0% transmittance and switching mechanism 56 is set in both single beam and double beam positions to verify zero single beam and double beam output signals as previously described.

Next switching mechanism 56 is set in the double beam position and sample attenuator 24 is adjusted to a transmittance value between points A and B in FIG. 2, for example 30% transmittance. That is, sample attenuator 24 is adjusted until recorder 54 reads 30% of full scale in the double beam mode. Switching mechanism 56 is then switched to the single beam position and gain control potentiometer 42 is adjusted until the recorded single beam output signal equals the recorded double beam output signal, e.g. potentiometer 42 is adjusted so that the recorder reads 30% of full scale in the single beam mode. The result of the foregoing adjustment is to modify the slope of segment AB in FIG. 2 so that segment AB lies along straight line segment AC as illustrated in FIG. 3.

Without further correction, the upper portion of the curve would take the form BC' illustrated in FIG. 3. The signal level sensitive impedance network 62 functions to modify the slope of segment BC' until the upper segment of the curve lies along segment BC. To achieve this correction switching mechanism 56 is left in the single beam position and sample attenuator 24 is adjusted until recorder 54 reads 100% of full scale. Switching mechanism 56 is then switched to the double beam position, and slider 70 of potentiometer 68 in nonlinear impedance network 62 is adjusted until the recorded double beam signal equals the recorded single beam signal at 100% of full scale. Adjustment of slider 70 in this manner adjusts the slope of the curved segment BC' until the upper segment lies along segment BC.

After setting the zero, 30% and 100% transmittance points on the curve, other intermediate points, for example 50% and 70% transmittance, may be checked and further adjustments made, if necessary, to ensure that all points on the curve lie along the linear path AC.

The signal level sensitive network 62 of the invention, referring to FIG. 3, functions to adjust the slope of curve segment BC' to that of segment BC to achieve a substantially linear relationship between $V_O$ and true sample transmittance. Point B of the curve represents the point at which the signal sensitive switch means, diode $D_1$, turns on. In this regard, adjustment of slider 66 of potentiometer 64 sets the turn on point of the diode and thus establishes the location of curve point B. Further, adjustment of slider 70 of potentiometer 68 in series with the diode $D_1$ establishes the slope of the curve segment BC. Thus, tailoring of the curve of FIG. 3 in accordance with the present invention is achieved in a simple and straightforward manner by adjusting potentiometer sliders 66 and 68 to establish the break point B and the slope, respectively, of the upper portion BC of the curve. It will further be appreciated that, in practice, diode $D_1$ does not turn on instantaneously but rather turns on in accordance with its known forward voltage vs. current characteristic. This is particularly advantageous in the present invention since the break point B of curve ABC', in practice, is not perfectly sharp as illustrated but rather is slightly rounded in the vicinity of point B. The turn-on characteristic of diode $D_1$ exhibits a similar rounding, so that the correction achieved by the signal level sensitive impedance network 62 establishes a linear curve ABC in spite of the inherent rounding about point B in spectrophotometer curve ABC'.

While the nonlinear plot of double beam vs. single beam readings has been illustrated in FIG. 2 having two segments AB and BC with a break point B therebetweeen, in some spectrophotometers the curve may have additional segments and break points. In this case, signal level sensitive impedance network 62 may be modified, for example, by including one or more additional circuit branches having a series connected diode, resistor, and potentiometer similar to elements D1, $R_3$, and 68 as shown in dotted outline in FIG. 1. Each branch will establish the break point and slope of a respective section of the curve.

From the foregoing it is evident that the present invention provides improved apparatus for calibrating a double beam optical null spectrophotometer to derive a signal $V_O$ truly indicative of sample transmittance. The signal level sensitive impedance network 62 responds to the level of signal $V_S$ supplied at the slider 52 of attenuator transmitting potentiometer 50 and changes impedance in a manner which corrects the linearity deviation of $V_S$. The calibartion apparatus is reliable in operation and is readily adjusted to achieve the desired correction. Moreover, while a preferred embodiment of the invention has been illustrated and described, it will be apparent that various modifications may be made therein without departing from the invention as defined in the following claims.

What is claimed is:

1. In a double beam optical null spectrophotometer including sample and reference optical beam paths, a radiation detector, an attenuator feedback loop connected to said detector for positioning an optical attenuator in the reference beam path in response to a detector signal indicative of an energy difference in the sample and reference beam paths to equalize the energy in said beam paths, a transmitting potentiometer having a slider movable with said attenuator and providing a potentiometer output signal at said slider as a function of the position of said attenuator, a recorder, means for selectively connecting said slider to said recorder to record said potentiometer output signal and apparatus for calibrating said transmitting potentiometer including means for selectively disabling said attenuator feedback loop and means for coupling the output of said detector to said recorder while said attenuator feedback loop is disabled and while said slider is disconnected from said recorder and while blocking one of said beam paths to record a measure of single beam energy of said spectrophotometer for selected levels of attenuation in the other of said beam paths, said connecting means selectively connecting said slider to said recorder at said selected levels of attenuation to record said potentiometer output signal at each of said selected levels of attenuation in addition to said measure of single beam energy, the improvement comprising:

a signal level sensitive impedance network connected to said slider of said transmitting potentiometer for modifying said potentionmeter output signal to achieve a substantially linear relationship between said potentiometer output signal and said measure of said single beam energy over a range of levels of attenuation including said selected levels of attenuation, said signal level sensitive impedance network including a first electrical resistance network having a variable resistor, a second electrical resistance network, means coupling said second electrical resistance network between said slider of said transmitting potentiometer and a source of potential, switch means including a nonlinear circuit element, means connecting said nonlinear circuit element in series circuit with said variable resistor of said first electrical resistance network between an adjustable slider on said second electrical resistance network and a source of potential, said adjustable slider adjusting the switching characteristic of said nonlinear circuit element and said variable resistor cooperating with said nonlinear circuit element to establish the impedance of said series circuit for modifying said potentiometer output signal to achieve a substantially linear relationship between said potentiometer output signal and said measure of said single beam energy over said range of levels of attenuation.

2. The spectrophotometer of claim 1 wherein said nonlinear circuit element is a diode.

* * * * *